United States Patent [19]

Wilson

[11] 4,178,745

[45] Dec. 18, 1979

[54] TOBACCO HANDLING APPARATUS

[75] Inventor: Robert W. Wilson, Charlotte, N.C.

[73] Assignee: Powell Manufacturing Company, Inc., Bennettsville, S.C.

[21] Appl. No.: 738,968

[22] Filed: Nov. 4, 1976

Related U.S. Application Data

[63] Continuation-in-part of Ser. No. 629,974, Nov. 7, 1975, abandoned.

[51] Int. Cl.² .......................................... A01D 45/16
[52] U.S. Cl. ..................................... 56/27.5; 414/26; 414/300
[58] Field of Search .............. 214/5.5, 17 C; 198/640, 198/641; 302/60; 56/27.5

[56] References Cited

U.S. PATENT DOCUMENTS

| | | | |
|---|---|---|---|
| 1,979,624 | 11/1934 | Klux | 214/17 C X |
| 3,357,749 | 12/1967 | Seymour et al. | 214/17 C X |
| 3,772,862 | 11/1973 | Wilson | 56/27.5 |
| 3,834,137 | 9/1974 | Long | 56/27.5 |
| 3,885,376 | 5/1975 | Johnson | 56/27.5 |
| 3,948,553 | 4/1976 | Suggs | 214/5.5 X |
| 4,047,365 | 9/1977 | Suggs | 214/17 C X |

*Primary Examiner*—Robert G. Sheridan
*Attorney, Agent, or Firm*—Cushman, Darby & Cushman

[57] ABSTRACT

Tobacco handling apparatus that receives tobacco from a source, such as a trailer, and elevates it by a conveyor to a discharge end from which it is discharged in a flow path having a substantial maximum horizontal extent disposed above a container that has a longitudinal horizontal extent aligned with and underneath the flow path for receipt of the tobacco leaves therefrom in condition for subsequent curing. A leaf distributing mechanism is included for varying the horizontal extent of the flow path within the maximum extent in a generally uniform manner to cause the leaves to be distributed substantially uniformly along the longitudinal extent of the container. The container is preferably a large size bulk curing container and the leaf distributing mechanism is preferably a plurality of deflectors which are oscillated laterally in conjunction with a longitudinal reciprocating movement. The leaves can be handled after harvesting at the barn or while harvesting takes place in the field.

7 Claims, 10 Drawing Figures

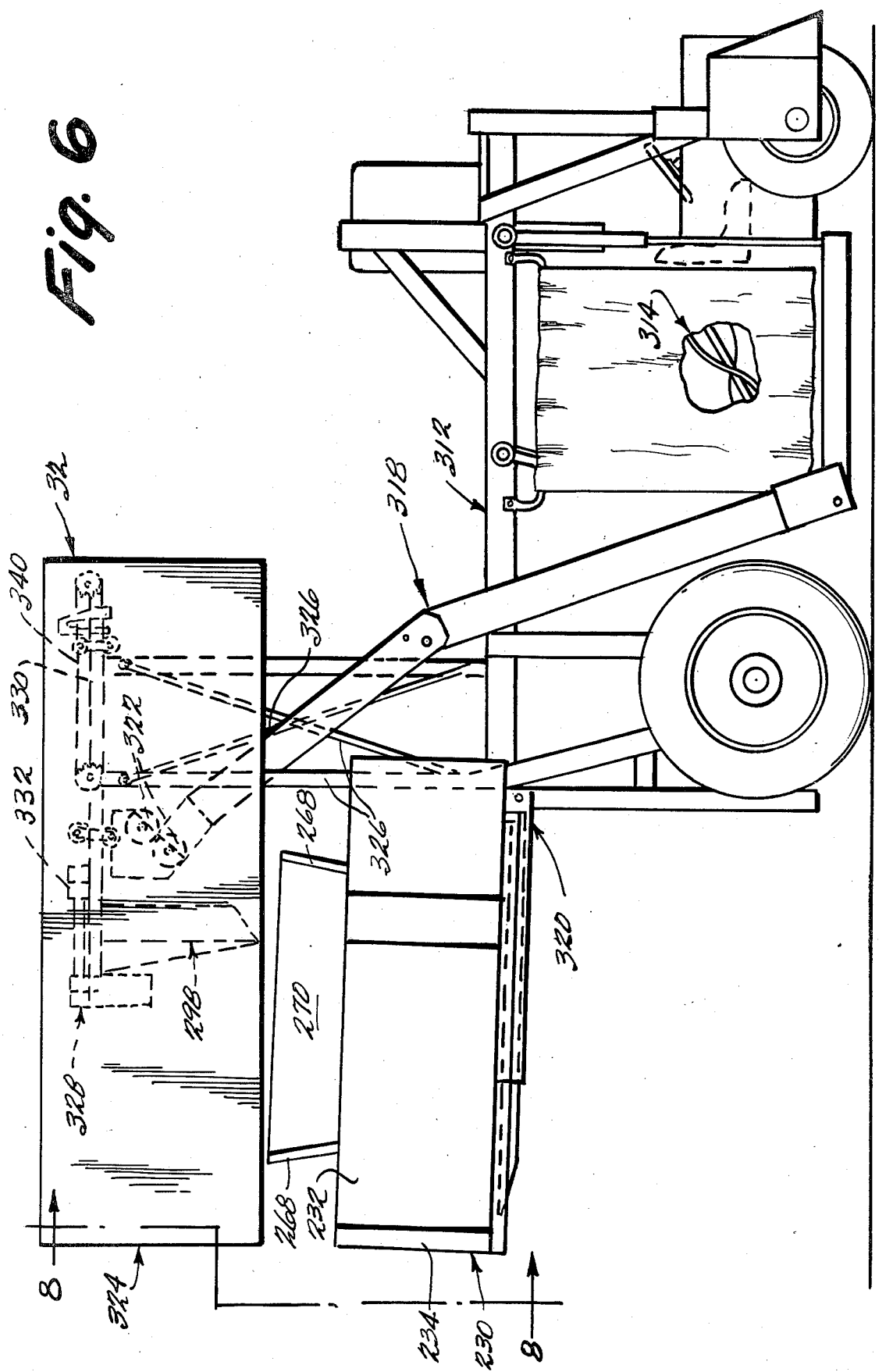

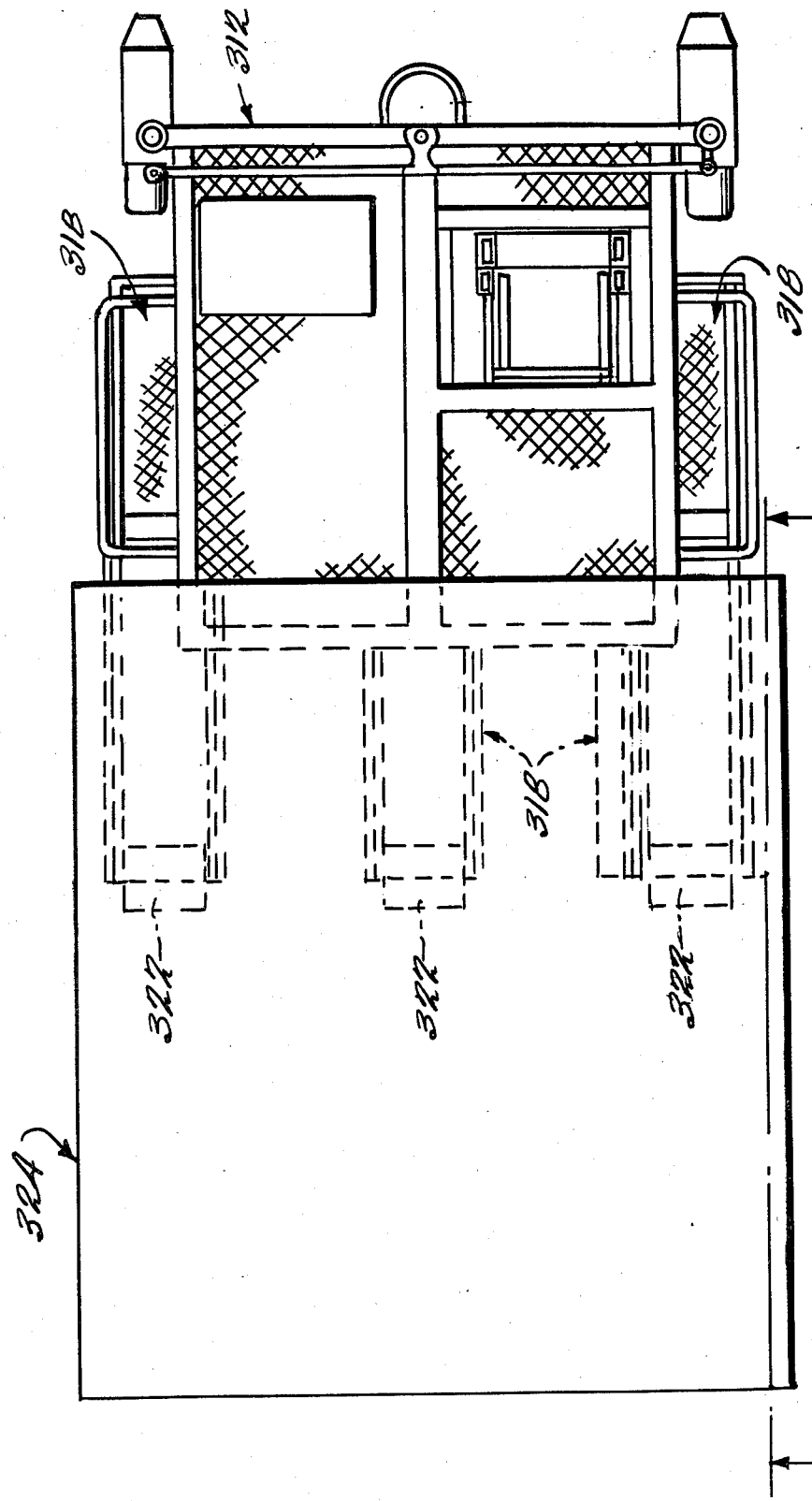

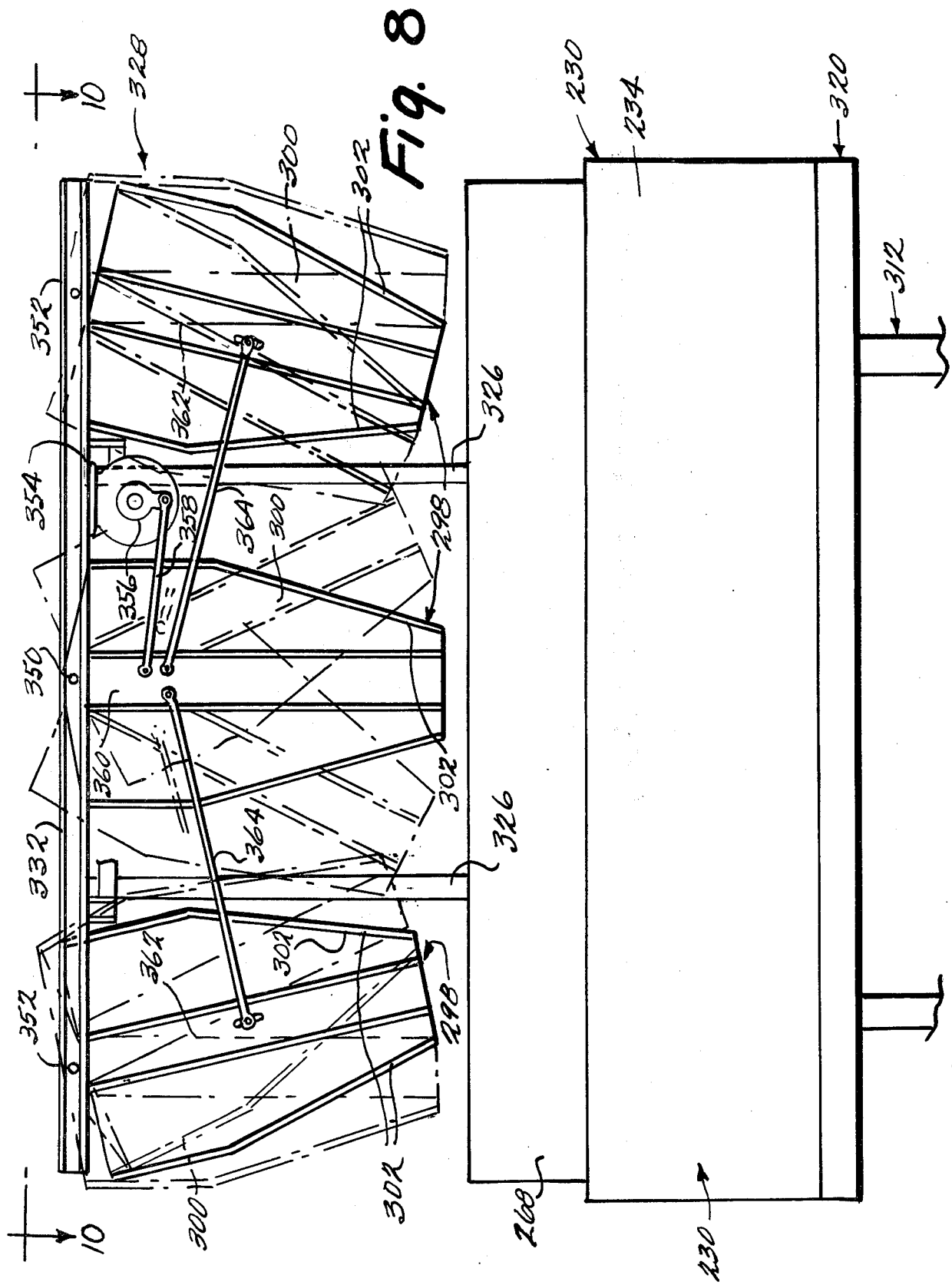

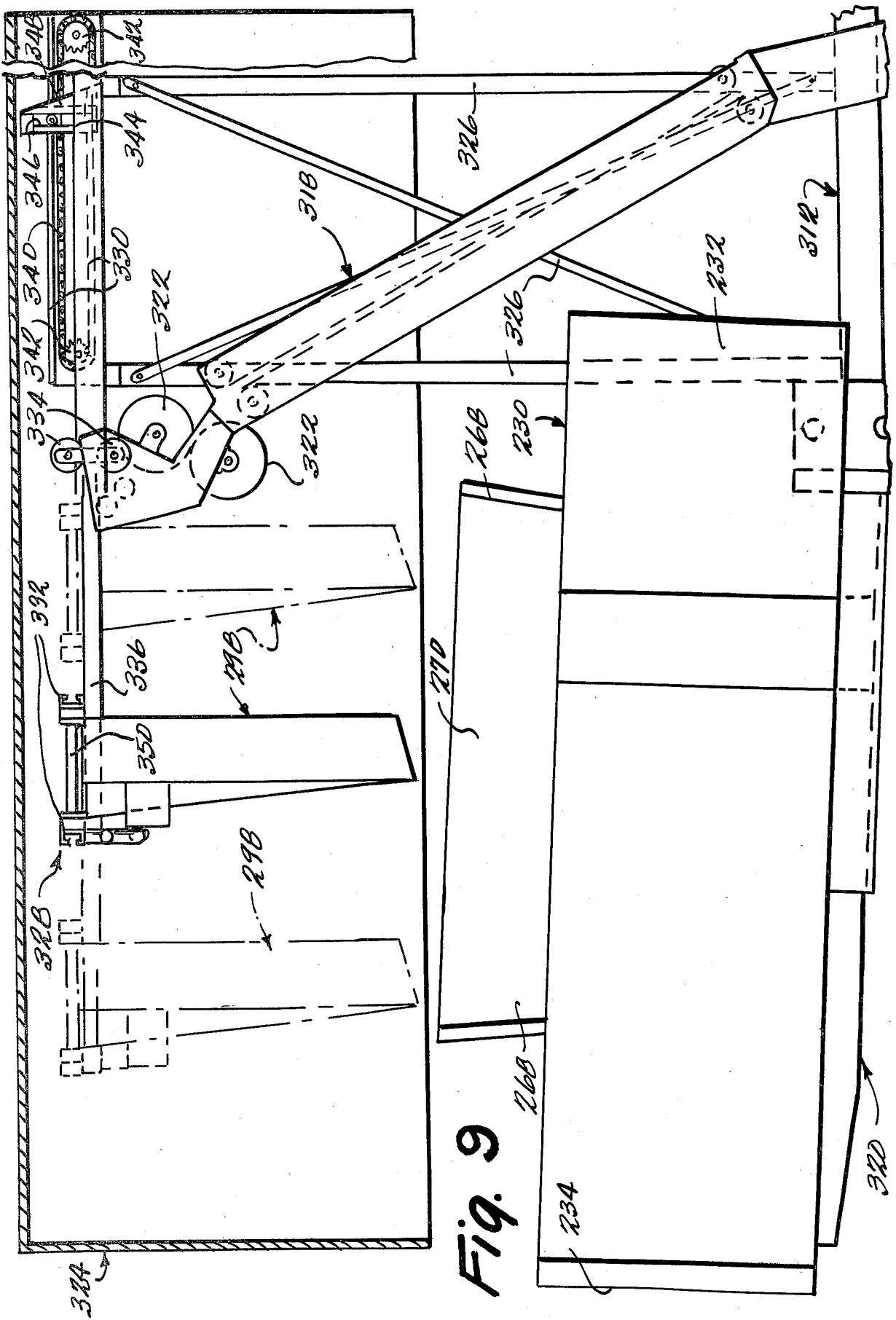

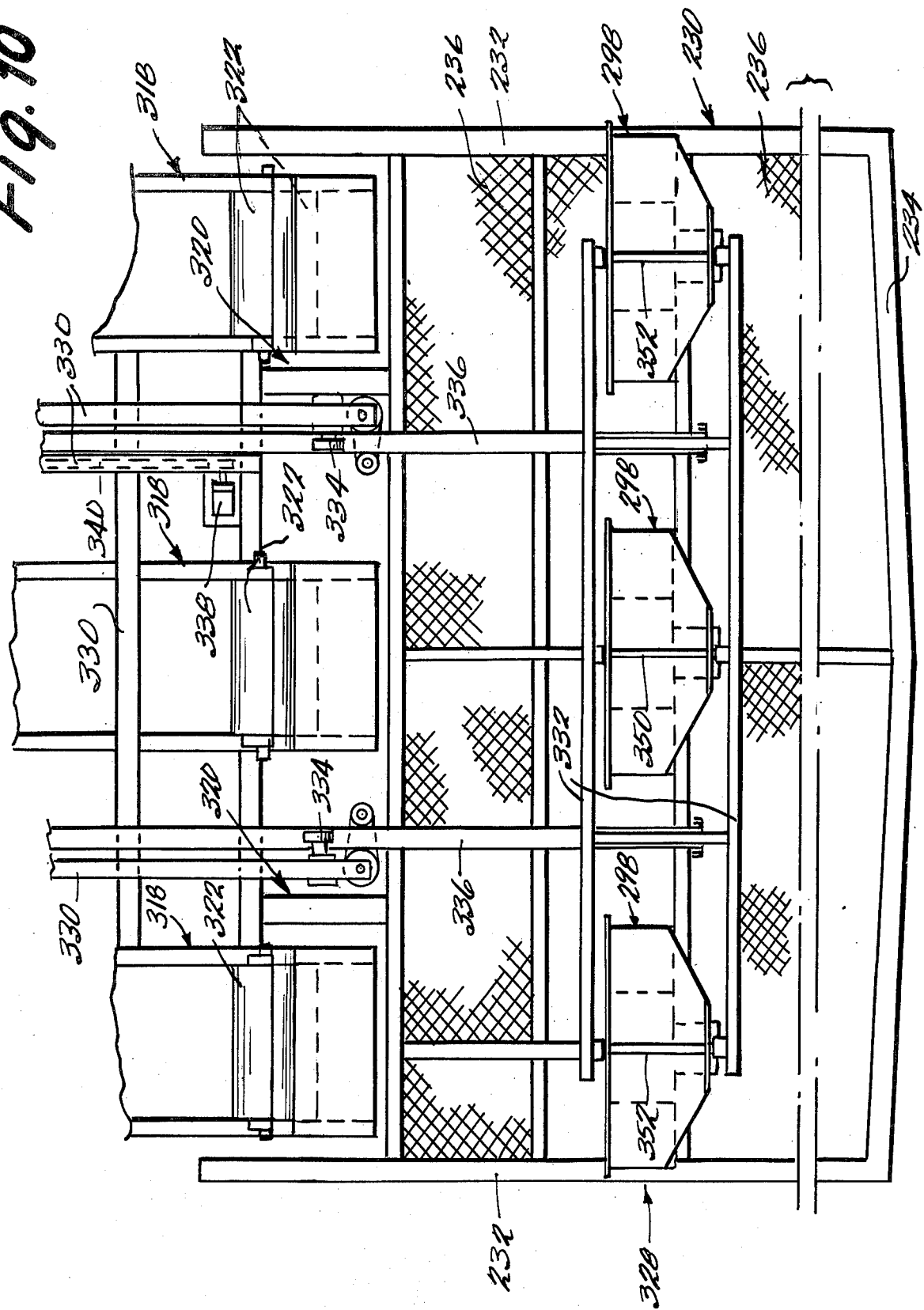

TOBACCO HANDLING APPARATUS

RELATED APPLICATION

This application constitutes a continuation-in-part of co-pending application Ser. No. 629,974 filed Nov. 7, 1975, now abandoned.

BACKGROUND OF THE INVENTION

The present invention relates to tobacco handling apparatus and more particularly to tobacco handling apparatus for transferring harvested tobacco leaves from a source to tobacco container means in preparation for support of the tobacco leaves during subsequent curing thereof.

Because of the thin, large area, irregular shape, lightweight and flaccid characteristics of tobacco leaves they have been difficult to handle mechanically and obtain any desirable uniform distribution satisfactory for racking for curing without some manual redistributing. Yet uniform distribution is essential in bulk curing of tobacco, which is otherwise adaptable to economical automatic processing, as the tobacco must be racked compactly without voids so that during bulk curing forced heated air will flow uniformly through the entire curing tobacco mass without flow concentration through voids.

Before the present invention, mechanical handling of tobacco prior to curing had evolved to the stage where tobacco leaves were mechanically harvested and loaded into trailers on combines and then transported to curing barns where the tobacco was manually removed from the trailers and loaded into racks. In some of these prior art operations the tobacco is mechanically fed into racks on combines with manual labor required to distribute the tobacco uniformly in the racks for proper bulk curing disposition.

In all of the known prior mechanical handling of tobacco into racks or trailers, the tobacco is discharged simply and directly into the trailers or racks with no control and without any significant horizontal extent to the flow. As a result, the trailers and racks have been disposed under the tobacco discharge, usually transverse thereto, and a laborer has been required to spread the tobacco outwardly from a central pile to uniformly fill the trailer or rack. In this stage of development and because of the unwieldy nature of tobacco leaves, it has not previously been considered possible to distribute tobacco leaves mechanically in an extended flow path with regulation to obtain uniform distribution into trailers or racks without manual handling.

In contrast to the prior art, the present invention provides tobacco handling apparatus that includes mechanical distributing of the tobacco leaves uniformly into containers in condition for subsequent bulk curing without requiring any manual redistributing, thereby enhancing the overall mechanization and providing an efficient and facile operation.

SUMMARY OF THE INVENTION

Briefly described, the present invention provides a tobacco handling apparatus for transferring harvested tobacco leaves from a source to tobacco container means in preparation for support of the tobacco leaves during subsequent curing. The apparatus includes conveyor means adapted to receive harvested tobacco leaves from a source and arranged for discharging the leaves from an end thereof in a flow path having a substantial maximum horizontal extent. Tobacco container means are disposed below the horizontal extent of the flow path and have a longitudinal horizontal extent aligned with and disposed underneath the maximum horizontal extent of the flow path for receipt of the tobacco leaves discharging from the conveyor means discharge end. The extent of the flow path is varied by deflecting means for varying the horizontal extent of the flow path within the maximum extent and over the longitudinal horizontal extent of the container means in a generally uniform manner to cause the leaves to be distributed substantially uniformly along the longitudinal extent of the tobacco container means.

Preferably the flow path varying means is deflecting means movable in the flow path, and is in the form of a baffle plate that is reciprocable or oscillatable in the flow path and may be combined with tobacco distributing rolls through the nip of which the tobacco leaves in the path pass for velocity and direction control thereby in the flow path.

The invention is applicable in handling leaves within containers which are bulk curing containers themselves. Where the curing barn arrangement utilized is of the type to receive the larger size containers (e.g. U.S. Pat. No. 3,948,553) or is of the type in which large size containers actually form the barn (as disclosed in co-pending application Ser. No. 649,674 filed Jan. 16, 1976), it is preferred to utilize the containers themselves as the container means for receiving the leaves.

Where the large size bulk curing containers are utilized which have a leaf containing volume with a width substantially greater than the width of the conveyor means feeding thereto, uniform leaf distribution throughout the width can be secured in accordance with the principles of the present invention by imparting a lateral oscillation to one or more leaf deflectors or baffles in addition to the longitudinal reciprocation previously mentioned.

Where the larger size bulk curing containers are utilized, it is preferable to handle the containers with a turntable apparatus as aforesaid. Moreover, since the large size bulk curing containers do not offer the same possibility of manual handling as racks even by two persons, it is important to provide power operation in the handling equipment whether performed with preharvested leaves at the curing bar location or in the field while riding on a mechanical leaf-defoliating combine.

BRIEF DESCRIPTION OF THE DRAWINGS

FIG. 6 is a side elevational view of a two-row tobacco combine having a rear fork lift mechanism for handling a large size bulk curing container of the type shown in FIGS. 1-3 and an improved leaf distributing mechanism for uniformly distributing the defoliated leaves into the container;

FIG. 7 is a top plan view of the combine shown in FIG. 6;

FIG. 8 is a fragmentary sectional view taken along the line 8—8 of FIG. 6;

FIG. 9 is a fragmentary sectional view taken along the line 9—9 of FIG. 7; and

FIG. 10 is a fragmentary sectional view taken along the line 10—10 of FIG. 8.

DESCRIPTION OF THE PREFERRED EMBODIMENTS

Figure 1:
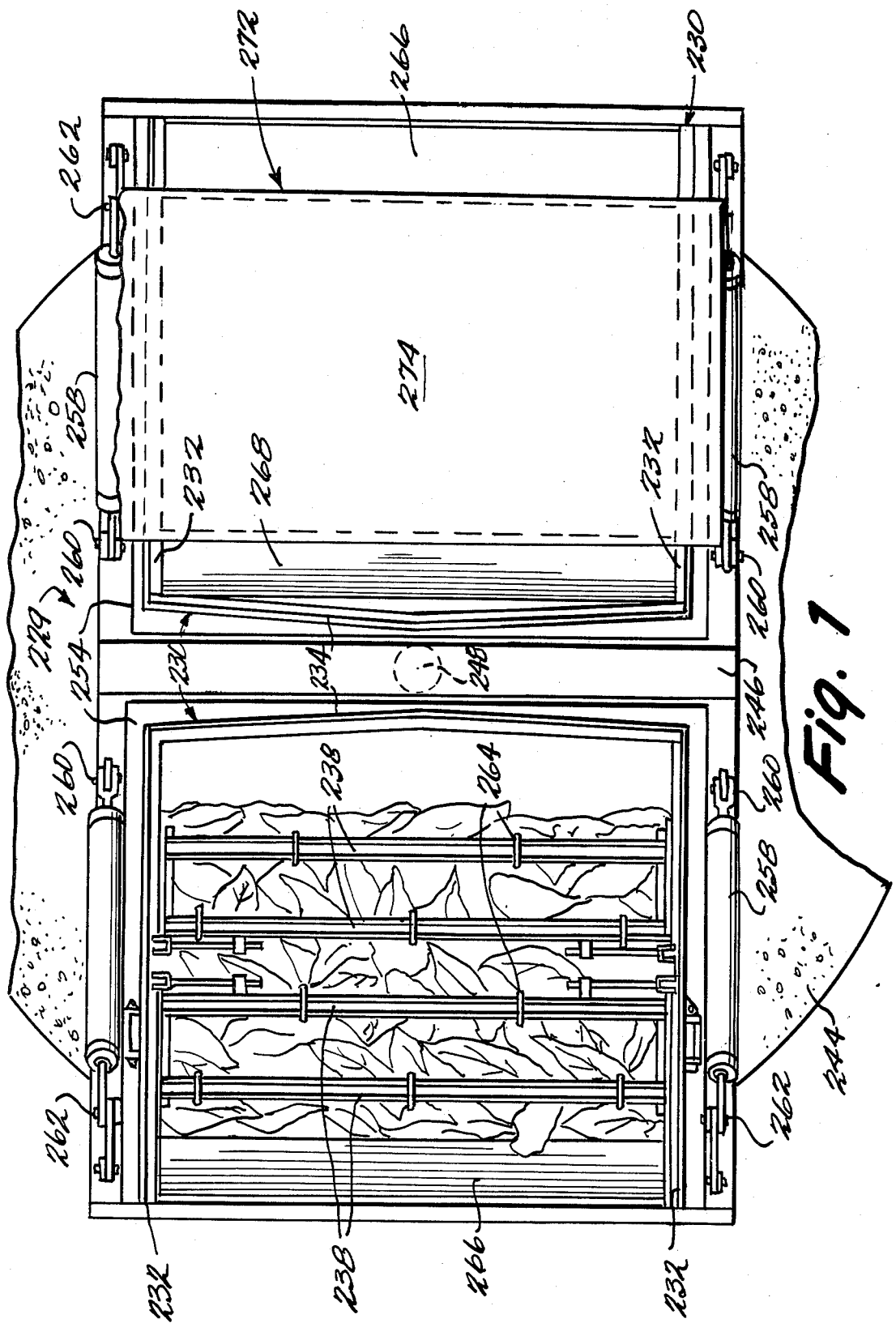
FIG. 1 is a top plan view of a modified turntable apparatus for handling large size bulk curing containers.

Referring to the drawings, there is shown a modified container arrangement 229 for handling large size containers 230 constructed in accordance with the teachings of my co-pending U.S. Pat. application Ser. No. 649,674 filed Jan. 16, 1976.

Figure 2:
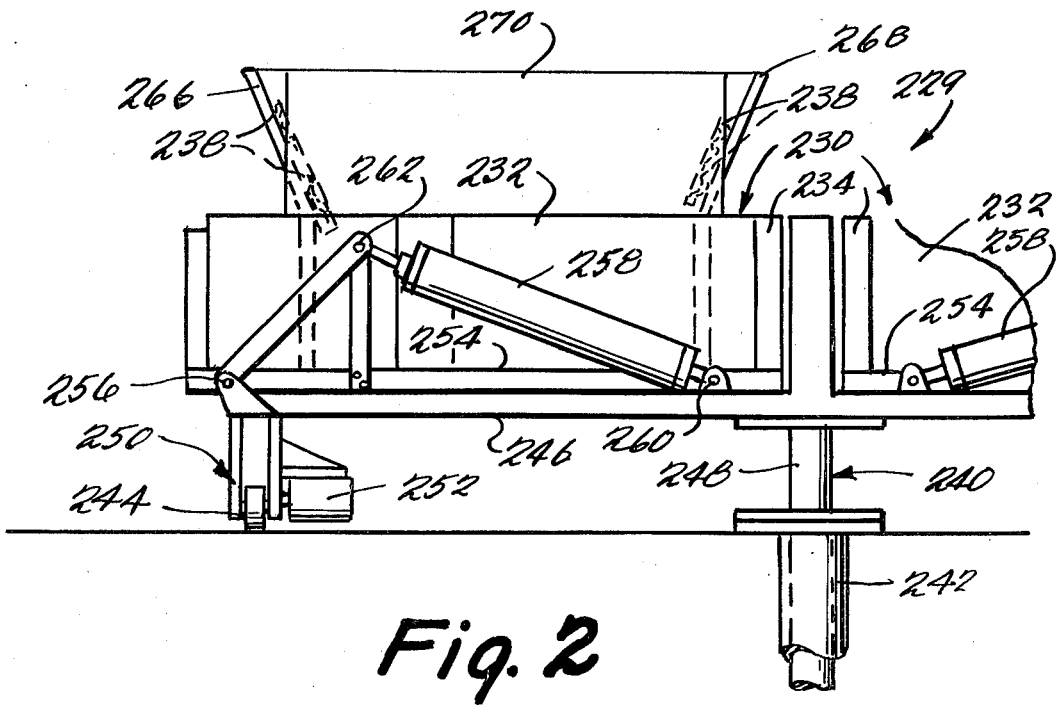
FIG. 2 is a fragmentary side elevational view of a part of the apparatus with an empty bulk curing container in a horizontal position preparatory to loading.
Figure 3:
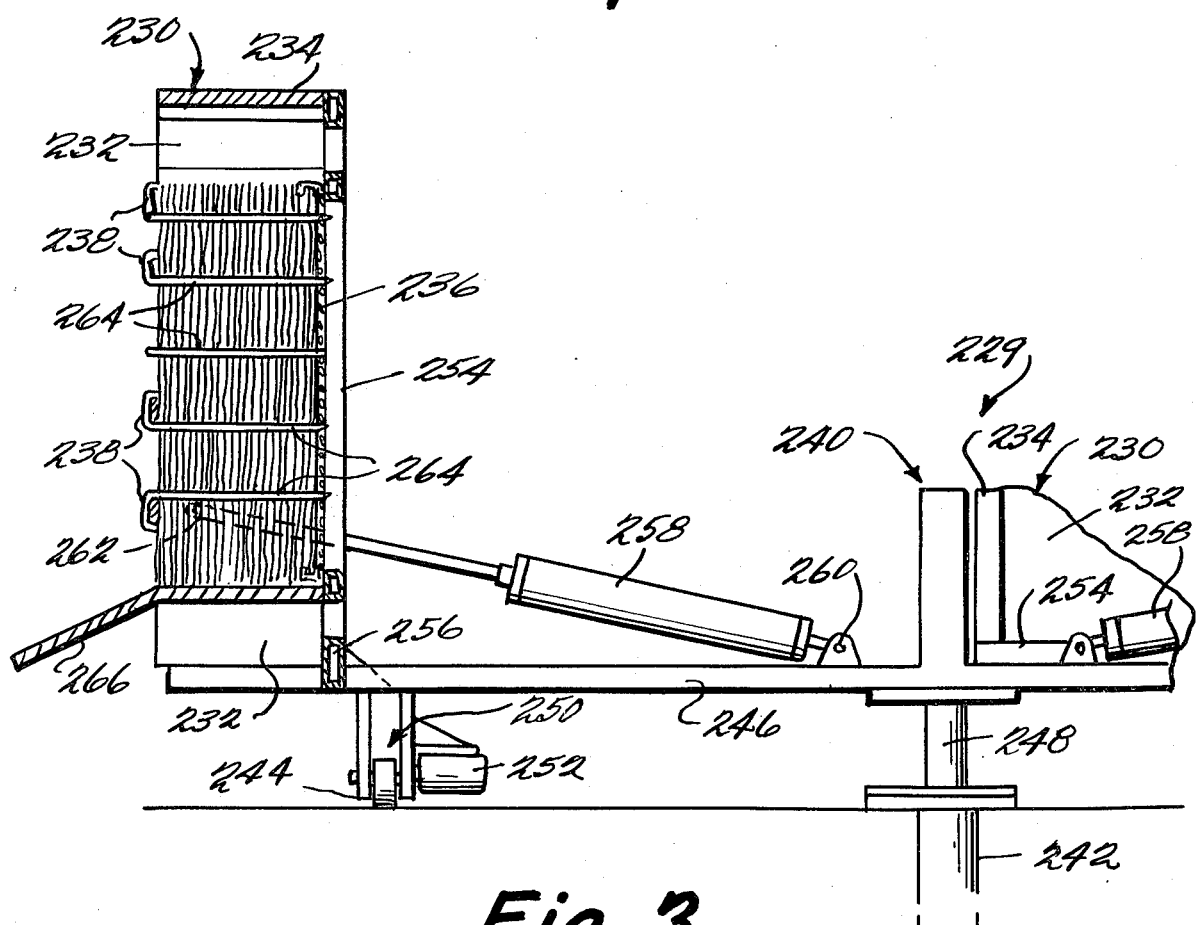
FIG. 3 is a view similar to FIG. 2 showing a loaded container in section moved to a vertical unloading position.

The container 230 is illustrated in FIGS. 1-3 and basically includes two imperforate side walls 232, an imperforate top wall 234 extending between one pair of end edges of the side walls, a perforated rear wall 236 fixed along one pair of side edges of the side walls, and a pair of door-like structures 238 pivotally mounted between the opposite side edges of the side walls for movement between a loading open position and a curing latched closed position. The disclosure of the aforesaid application is complete as to details of construction and operation of the container 230, which disclosure is hereby incorporated by reference into the present specification, so as to eliminate the necessity of repeating such details herein.

As disclosed in the aforesaid application, the container 230 is of a size sufficient to form a section of the curing barn itself. In terms of weight, approximately 1500 pounds of tobacco can be loaded in a single large container 230 (as compared to approximately 40 pounds for the conventional rack). In terms of size, the actual leaf bed itself is approximately 10'×6' in plan and 3' deep, viewed when the container is in its horizontal loading position.

The increased size of the container 230 as compared with a conventional rack, requires some modification in the leaf-distributing mechanism, primarily in order to accommodate the larger width of the volume within which the leaves are loaded. Insofar as the handling of the larger containers 230 during loading is concerned, a turntable arrangement, such as generally indicated at 240, is preferred for handling the larger containers 230, since the increased dimensions of the container volume can be accommodated within the maximum horizontal extent of the leaf flow path provided much more readily in this fashion.

As best shown in FIGS. 1-3, wherein the turntable apparatus 240 is illustrated somewhat schematically, it will be noted that the weight of and carried by the apparatus is such that it is preferable to prepare the location of use by laying a concrete slab which provides an in-ground tubular bearing 242 and a horizontal circular track 244. The apparatus 240 includes a main frame 246, which is shown generally diagrammatically since it may be of any suitable construction. The frame 246 is horizontal and is of rectangular shape in plan having a vertical spindle 248 fixed to the central portion thereof which is journaled in bearing 242. The outer central portions of the frame 246 are supported by wheel or roller assemblies 250 riding on the circular track 244. One or both of the roller assemblies 250 is provided with a power drive, such as a hydraulic motor 252 or the like.

Mounted on the main frame 246 on opposite sides of the spindle 248 is a pair of container handling subframes 254. Again, since the subframes 254 may embody any suitable construction, they are illustrated somewhat schematically in the drawings. Each subframe 254 is of generally L-shaped configuration in elevational shape and is pivotally interconnected at a position adjacent the intersection of its legs with the associated outer end of the main frame 246, as indicated at 256.

As best shown in FIGS. 2 and 3, each subframe is movable about its pivot 256 between a vertical container receiving and discharging position (FIG. 21) and a horizontal container loading position (FIG. 2). When in the vertical position shown in FIG. 21, the container 230 is disposed in a vertical position corresponding with the position it assumes during curing and the subframe supports it beneath the lower end edges of the side walls 232. As the subframe is moved from the vertical position shown in FIG. 3 to the horizontal position shown in FIG. 2 wherein the container extends horizontally, the support of the container is shifted from beneath the lower end edges of the side walls to the side edges thereof and the associated perforated rear wall 236 and side edge of the top wall 234.

Suitable power means is provided for effecting the pivotal movement of each subframe between its vertical and horizontal positions. As shown, such power means is in the form of a pair of hydraulic piston and cylinder units 258, each of which is pivoted at one end to the associated side portion of the main frame 246, as indicated at 260, and at its other end, as indicated at 262, to a rigid pivot structure fixed to the associated side portion of the subframe 254.

The operation of the turntable apparatus 240 is similar to that of the turntable apparatus previously described in that the two containers 230 carried thereby are movable between two positions by virtue of a 180° pivotal movement of main frame 246 about the pivotal axis of the spindle 248 within bearing 242 through the operation of motor 252 and associated driving wheel assembly 250. The container 230 in a first position is supported so that the associated subframe 254 can be pivoted between its vertical and horizontal positions through the operation of the hydraulic piston and cylinder units 258 (suitably connected to a suitable source of hydraulic pressure). Thus, in this first position of rotary movement, a horizontally supported loaded container 230 can have the loading procedures relating thereto completed as by moving the door structures 238 from their open position to their latched closed position and inserting a plurality of separate two-pronged tines 264 through the tobacco. With the container thus prepared, the units 258 are energized to move the loaded container into a vertical position for handling by a fork lift vehicle in accordance with the disclosure of the aforesaid application. Thereafter an empty container 230 can be transferred to the vertically positioned subframe 254 and lowered into a horizontal position. Next, the horizontally positioned empty container 230 is prepared at the first position for the loading of leaves therein after it has been moved into the second position of rotary adjustment. Such preparation includes the opening of the door structures 238 and the establishment of suitable peripheral guide structures for directing and maintaining the leaves within the loading space within the container. While any type of peripheral guide structures may be provided which will accomplish the desired result, either on each container or separate therefrom, as shown, separate guide structures are preferred one of which, indicated at 266, is fixed to each subframe in a position to define the lower surface of the leaf loading space within a container supported thereby. The opposite upper surface of the loading space is defined by a first removable guide structure 268 suitably removably mounted between the container side walls 232. Guide structures 270 are suitably removably mounted above the upper edges of the side walls 232 to direct leaves therebetween and retain them thereabove as loading is completed.

Figure 4:
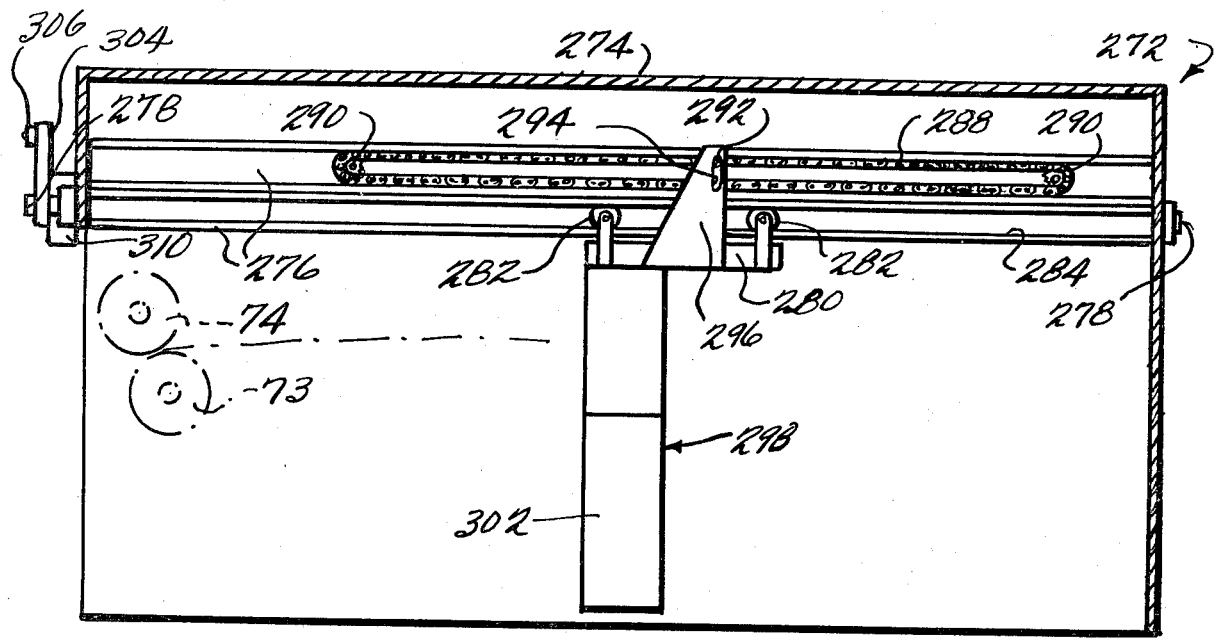
FIG. 4 is a side elevational view with parts broken away of a leaf distributing mechanism utilized with the device shown in FIGS. 1-3.
Figure 5:
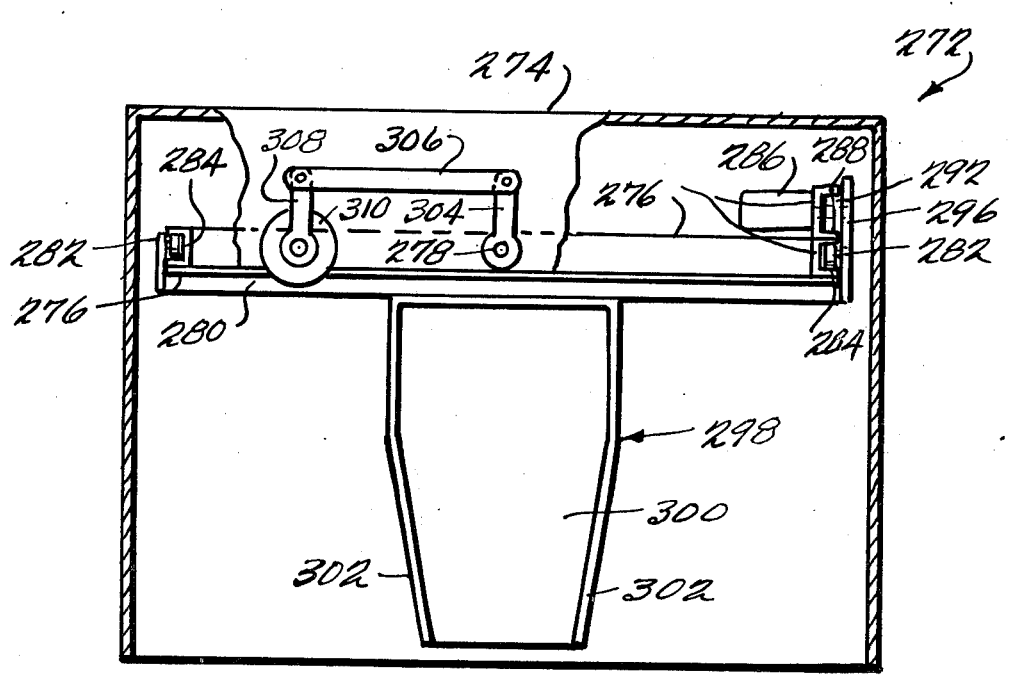
FIG. 5 is a front elevational view with parts broken away of the leaf distributing mechanism shown in FIG. 4.

Leaf loading is accomplished with the container 230 in a second position of rotary adjustment and with the container 230 in a horizontal position on the associated subframe 254 through the operation of a tobacco handling apparatus provided with a modified leaf-distributing mechanism, which is illustrated in FIGS. 4 and 5 and generally designated by the numeral 272. The mechanism 272 utilizes a lateral oscillating movement which is superimposed upon the reciprocating movement to provide for uniform lateral distribution as well as uniform longitudinal distribution, and employs baffle structures which are specially constructed to impart lateral movement to the leaves engaged thereby, which structures are mounted in side-by-side relation for reciprocating movement throughout the flow path.

To this end, there is provided a distributing section 274 which extends horizontally outwardly from above the distributing rolls 73 and 74 previously described in copending application Ser. No. 629,974, the disclosure of which is hereby incorporated by reference into the present specification. The section 274 is provided with a frame similar to the frame 22 of the aforesaid application as is clearly illustrated in the drawings, in addition, however there is provided a separate frame 276 which performs the same function as the frame 22 in FIG. 18 of the aforesaid application in the sense that it forms a part of the reciprocating movement producing means. Frame 276 is mounted within the frame of section 274 for oscillatory pivotal movement about a horizontal longitudinally extending axis as by a shaft 278 fixedly carried by the central portion of the frame 276. As shown, the ends of the shaft 278 extend outwardly of the frame 276 and are suitably journaled in the ends of the section 274.

Mounted on the frame 276 for horizontal reciprocation in opposite longitudinal directions is a carriage 280. As shown, this mounting is accomplished by guide rollers 282 mounted on the carriage 280 and supported in and rollable along horizontal guide channels 284 mounted on the frame 276. The means for effecting the reciprocating movement of the carriage 280 is preferably by a hydraulic drive motor 286 mounted on the frame 276 and which drives a chain 288 that is trained around a pair of sprockets 290 spaced horizontally on the frame 276. The chain carries a laterally projecting pin 292 that rides in a slot 294 of an arm 296 extending from the carriage 280. The slot 294 is of sufficient vertical extent to accommodate the pin 292 as it follows the upper and lower reaches of the chain 288 and around the sprockets 290. Thus, as the chain 288 moves in a continuous path it will effect reciprocation of the carriage 280.

As best shown in FIGS. 4 and 5 a baffle structure, generally indicated at 298, is fixedly mounted on the carriage 280 in depending relation therefrom symmetrically with respect to a vertical plane passing through the axis of shaft 278, which plane also bisects the width of the distributing rolls 73 and 74. The baffle structure 298 includes a vertically extending baffle plate 300 of generally rectangular planar configuration but having the lower portions of opposed vertical edges cut off along downwardly converging lines. These edges have lateral baffle plates 302 welded thereto and extending horizontally therefrom in a longitudinal direction toward the rolls 73–74, the baffle plates 302 preferably extending upwardly and joining along the upper horizontal edge in order to provide the composite baffle structure with rigidity while utilizing minimum weight.

Since the baffle structure 298 is rigidly mounted on carriage 280, oscillatory pivotal movement of the carriage with the frame 276 about the axis of shaft 278 will result in imparting a simultaneous lateral oscillatory movement of the baffle structure 298 within the flow path of the leaves projected from between the rolls 73 and 74. Any suitable means may be provided to effect the aforesaid pivotal movement. As shown, one end of the shaft 278 has fixed thereto a radially extending arm 304. A connecting rod 306 is pivotally connected at one of its ends to the outer end of the arm 304 and at its other end to the outer end of a crank 308 fixed to the output shaft of a hydraulic motor 310 mounted on the frame of the section 274.

It will be understood that the frequency of the cyclical movements of the baffle structure and the displacements during each cycle can be varied to suit the particular requirements. Exemplary values applicable to a container 230 which has a leaf loading volume with a length dimension of approximately 10' (measured in the longitudinal direction of the flow path) and a width dimension of approximately 5–6' (measured laterally or horizontally perpendicularly to the longitudinal direction) and distributing rolls with an axial dimension of approximately 16' are a longitudinal reciprocating frequency of 2½ cycles per minute with a displacement of approximately 110" in each direction in each cycle and a lateral oscillatory frequency of 4 cycles per minute with a displacement of approximately 36 degrees in each direction in each cycle and with the lower discharge ends of the baffle plates 298 having a linear displacement of approximately 39" in each direction in each cycle.

As previously indicated, the present invention is not intended to be limited to a particular conveyor system or trailer construction and the invention is adapted as well for use directly on a combine wherein the tobacco would be conveyed from the defoliating mechanisms to tobacco containers carried on the combine as the combine is harvesting tobacco in a field. An arrangement of this type is illustrated in FIGS. 6–9. The combine shown is of the type specifically described in U.S. Pat No. 3,772,862, the disclosure of which is hereby incorporated by reference into the present specification, although the herein depicted combine is of two row capacity rather than the one row capacity of the patent.

A detailed recitation of the construction and operation of the combine is not necessary to an understanding of the present invention, since reference to the patent may be undertaken for such details. For present purposes it is sufficient to note that the combine includes a wheeled vehicle frame, generally indicated at 312, movable through a tobacco field along a pair of rows of tobacco plants therein so that two side-by-side pairs of cooperating tobacco leaf defoliating units, generally indicated at 314, can effect removal of tobacco leaves therefrom. The units 314 are mounted on the wheeled vehicle frame 312 by a vertically movable mounting mechanism (not shown) operable to position the units on opposite sides of two adjacent rows of tobacco plants in any selected vertical position so as to remove selected leaves therefrom as the wheeled vehicle frame is moved therealong. A conveyor system, generally indicated at 318, is carried by the frame 312 for collecting the leaves removed by the defoliating units 314 on opposite sides of each row and moving the removed leaves rearwardly and upwardly with respect to the frame to three discharge positions aligned with the row furrows and spaced above the plants in the rows. Carried on the rearward portion of the frame 312 is a fork lift mechanism, generally indicated at 320, operable to supportingly cooperate with a horizontally extending container 230, so as to move the container between a lower receiving position and an elevated operative position where it is maintained during movement of the wheeled vehicle frame 312 through the field along the rows of plants.

As previously indicated, the conveyor system 318 is operable to receive the removed leaves and move them rearwardly and upwardly with respect to the frame to three discharge positions. The system 318 therefore involves the utilization of three laterally spaced conveyor assemblies, each of which is similar in construction to one of the two conveyor assemblies shown and described in the aforesaid patent, as well as the conveyor assembly such as embodied in the tobacco handling apparatus 20 the aforesaid application. The central one of the three conveyor assemblies provided is positioned to receive leaves laterally from both defoliating units 314, whereas each outer conveyor assembly receives leaves laterally from only the one defoliating unit 314 associated therewith. Thus the central conveyor assembly handles approximately twice the number of leaves as each outer conveyor assembly.

As best shown in FIGS. 6, 7 and 9 a pair of cooperating leaf distributing rolls 322, similar to the rolls 73–74 previously described, is provided in cooperating relation with each conveyor assembly for the purpose of effecting the projection of leaves along a flow path above the position of the container 230 supported on the fork lift mechanism 320 therebelow. Viewed in side elevation, the flow path of each pair of rolls 322 is of similar configuration and superimposed one with respect to the others, whereas, viewed in plan the flow paths are laterally spaced and in parallel relation with respect to one another.

As in the previous embodiments, a tobacco handling section, generally indicated at 324, is provided over the flow path and the container 230 which receives the leaves projected therein. The section 324, as before, is in the form of a canopy suitably mounted in a stationary operative position with respect to the operative position of the container 230. In the embodiment shown, there is provided suitable rigid bracing elements 326 fixed to the vehicle frame 312 which serve not only to mount the canopy 324 but to provide support for the upper end of the associated conveyor assemblies and rolls 322 as well.

As with the other embodiments disclosed, there is provided a leaf distributing mechanism 328 which serves to distribute the leaves in the flow paths generally uniformly within the leaf loading space within the container 230 therebelow not only in a longitudinal direction with respect to the horizontal direction of movement of the leaves within the flow paths but in a lateral direction as well.

In regard to this longitudinal and lateral distribution, it will be noted that the container 230 within which the leaves are distributed is oriented with respect to the aforesaid longitudinal and lateral directions of the flow paths in a position displaced 90° horizontally in relation to the position of the container 230 in the embodiment of FIGS. 1–5. As previously indicated, the leaf loading space of the container when in its horizontal loading position has horizontal dimensions of approximately 10 feet measured from side wall to side wall and 5 to 6 feet (depending on the leaf variety, stalk position etc.). Whereas before, the elongated measurement of the leaf loading space was aligned with the longitudinal direction of the associated flow path, such enlongated dimension in the presently described embodiment is aligned at 90° angles to the longitudinal direction of the associated flow path. Moreover, it will be noted that insofar as the horizontal dimensions of the container 230 itself is concerned, they are approximately the same so that neither is appreciably elongated with respect to the other. Consequently, the term "longitudinal" as used in describing the horizontal extent of the container which is operatively aligned with the longitudinal extent of the flow path is a relative term which is related to the longitudinal direction of the flow path rather than to any other horizontal extent of the container. This relationship is evident from the fact that the same container 230 can be oriented in either relation with respect to the flow path depending upon whether utilized in the barn location embodiment of FIGS. 1–5 or in the field location embodiment of FIGS. 6–10. The critical relationship is that the longitudinal horizontal extent of the leaf loading space provided by the container is sufficient to require distribution.

It will be noted that wherein the lateral distribution of the leaves coming from the single pair of rolls 73–74 in the embodiment of FIGS. 1–5 is accomplished by a single baffle structure 298, the embodiment of FIGS. 6–10 illustrates a further variation in which a plurality of baffle structures is provided but each is separately mounted with respect to the other and each is associated with one of a plurality of flow paths corresponding in number to the number of baffle structures utilized.

Referring now more particularly to FIGS. 8–10, the leaf distributing mechanism 328 includes a main frame 330, similar to the main frame 276 of the embodiment of FIGS. 1–5 and a carriage 332 mounted on the frame 330 for longitudinal horizontal reciprocating movement in a manner similar to the carriage 280. As shown, this mounting is accomplished by horizontally spaced pairs of vertically spaced guide rollers 334 mounted on the frame 330 so as to support rollingly therebetween horizontal longitudinal frame members 336 forming a part of the carriage 332 mounted on the frame 330. The means for effecting the reciprocating movement is similar to that shown in FIGS. 18 and 22. Thus, the carriage 332 is reciprocated by a hydraulic drive motor 338 mounted on the frame 330 and which drives a chain 340 that is trained about a pair of sprockets 342 spaced horizontally on the frame 330. The chain carries a laterally projecting pin 344 that rides in a slot 346 of an arm 348 extending from the carriage 332. The slot 346 is of sufficient vertical extent to accommodate the pin 344 as it follows the upper and lower reaches of the chain 340 and around the sprockets 342. Thus, as the chain 340 moves in a continuous path it will effect reciprocation of the carriage 332.

As best shown in FIGS. 8 and 10, three baffle structures are carried by the carriage 332 in depending relation therefrom and in side-by-side relation with respect to one another symmetrically with respect to a vertical plane passing through the center of the leaf loading space of the container 230 supported therebelow. As previously described, each baffle structure 298 includes a vertically extending baffle plate 300 of generally rectangular planar configuration but having the lower portions of opposed vertical edges cut off along downwardly converging lines. These edges have lateral baffle plates 302 welded thereto and extending horizontally therefrom in a longitudinal direction toward the associated rolls 322, the baffle plates 302 preferably extending upwardly and joining along the upper horizontal edge in order to provide the composite baffle structure with rigidity while utilizing minimum weight.

Each of the baffle structures 298 is mounted on carriage 280 for oscillatory pivotal movement about a longitudinally extending axis which is disposed in a vertical plate which bisects the width of the associated rolls 322. As shown, the central baffle structure is mounted on a shaft 350, which, in turn, is mounted on the carriage 332 in a position such that its axis is disposed within the aforesaid vertical plane of symmetry associated with the central baffle structure. Similarly each of the laterally outer baffle structures is mounted on a shaft 352 on the carriage 332 in a position such that their axes are aligned within the vertical planes of symmetry associated therewith.

As in the previously described embodiment, means is provided for effecting lateral swinging movement of the baffle structures about the axes of their respective shafts. In this instance, however, the means is mounted on the carriage 332 for longitudinal reciprocation. As before, the means for effecting the lateral swinging or oscillating movement comprises a hydraulic motor 354 (whose power source, not shown, is connected therewith through suitable flexible lines, not shown, all of which will be readily apparent to those skilled in the art) having a crank arm 356 connected to its output shaft. A connecting rod 358 is pivoted at one of its ends to the outer end of the crank arm 356 and has its other end pivotally connected with a vertical channel member 360 fixed to the back of the central baffle structure at a position spaced from the axis of the associated shaft 350. The outer baffle members are provided with similar rear channel members 362 and each has a connecting rod 364 associated therewith which is pivoted at one end with the associated channel member 362 and at its other end to the channel member 360 of the central baffle member.

Again, as previously described, the baffle structures 298 may be moved both longitudinally and laterally at any suitable speed. An exemplary value with respect to the longitudinal reciprocation is a displacement of approximately 52" in each direction at a frequency of 4 cycles per minute. With respect to the lateral oscillatory movement, the center baffle structure 298 is given an angular displacement of 42° in each direction during each cycle which corresponds with a linear displacement of the lower outlet end of 32" in each direction during each cycle. It will be noted that the oscillatory movement of the center baffle structure is symmetrical with respect to the aforesaid vertical plane of symmetry, that is, the angular displacement with respect to the vertical plane of symmetry is 21° on each side. The two outer baffle structures 298 each have an angular displacement of 21° in each direction in each cycle which corresponds with a linear displacement of 16½" in each direction of the lower discharge end thereof. It will be noted that the position of displacement in each outer baffle structure with respect to its associated vertical plane of symmetry is solely inwardly thereof. The frequency of the lateral pivotal movement of each of the baffle structures is the same and approximately 23 cycles per minute.

It will be noted that the embodiments of FIGS. 1–10 of the present invention function such that the baffle structures serve to stop the movement of the leaves within their flow path and after the leaves have been stopped in their flow path in the longitudinal horizontal direction, the baffle structures, and particularly the horizontally extending surfaces thereof, serve to impart a lateral horizontal movement to the leaves in conjunction with their vertical gravitational movement after engagement with the baffle structures. While the lateral movement is preferably an oscillatory swinging or pivotal movement, it will be understood that other types of lateral movement such as reciprocatory movement could be utilized if desired.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. Tobacco handling apparatus for transferring harvested tobacco leaves from a source to tobacco container means in preparation for support of said tobacco leaves during subsequent curing thereof, said apparatus comprising conveyor means adapted to receive harvested tobacco leaves from a source and arranged for discharging the leaves from an end thereof in a flow path having a substantial maximum horizontal extent, tobacco container means disposed below said horizontal extent of said flow path and having a longitudinal horizontal extent aligned with and disposed underneath the maximum horizontal extent of said flow path for receipt of the tobacco leaves discharging from said conveyor means discharge end, and means for varying the horizontal extent of said flow path within said maximum extent and over said longitudinal horizontal extent of said container means in a generally uniform manner to cause said leaves to be distributed substantially uniformly along the longitudinal extent of said tobacco container means, said means for varying the extent of the flow path of discharging tobacco leaves comprising baffle means having surfaces for stopping the horizontal movement of the leaves in said flow path while permitting continued downward movement and for imparting a lateral movement to the leaves in conjunction with the continued downward movement thereof and moving means for effecting repetitious cyclical movements of said baffle means in both longitudinal and lateral horizontal directions sufficient to distribute the leaves within said tobacco container means not only uniformly along the longitudinal extent thereof, as aforesaid, but the lateral extent thereof as well.

2. Tobacco handling apparatus as defined in claim 1 and further characterized in that said tobacco container mean comprises a container comprising a pair of generally parallel opposed imperforate side walls of generally elongated rectangular configuration, a third imperforate wall extending between one pair of end portions of said pair of side walls and a tobacco engaging and supporting wall extending between one pair of opposed side edge portions of said side walls, said container being in a leaf loading position when disposed below said horizontal extent of said flow path as aforesaid, said tobacco engaging and supporting wall being disposed generally horizontally and said imperforate walls extending upwardly therefrom when said container is in said leaf loading position, said container being movable from said leaf loading position when loaded into a curing position, said container being of a size sufficient to form a section of a complete tobacco curing barn when disposed in said curing position wherein (1) said side walls extend generally vertically to provide components of exterior side walls of a composite tobacco curing barn and (2) said third wall constitutes a top wall and extends generally horizontally to provide a component of the exterior roof of a composite tobacco curing barn.

3. Tobacco handling apparatus as defined in claim 1 further characterized by said baffle means including a plurality of vertically extending baffle plates providing said horizontal movement stopping surfaces each having spaced peripheral downwardly diverging baffle plate portions providing said lateral movement effecting surfaces extending longitudinally therefrom in a direction opposed to the direction of leaf movement longitudinally within said flow path.

4. Tobacco handling apparatus as defined in claim 3 further characterized by a longitudinally extending frame, a carriage mounted on said frame for longitudinal reciprocating movement on which said baffle means is carried.

5. Tobacco handling apparatus as defined in claim 4 further characterized by three laterally spaced baffle plates being mounted for pivotal movement about three parallel horizontal longitudinal axes.

6. Tobacco handling apparatus as defined in claim 1 further characterized by a longitudinally extending frame mounted for pivotal movement about a horizontal longitudinal axis, a carriage mounted on said frame for longitudinal reciprocating movement, said baffle means comprising a vertically extending baffle plate mounted on said carriage providing said horizontal movement stopping surfaces and having spaced peripheral downwardly diverging baffle plate portions providing said lateral movement effecting surfaces extending longitudinally therefrom in a direction opposed to the direction of leaf movement longitudinally within said flow path.

7. Apparatus for loading a large size container within which tobacco leaves are cured, a wheeled self-propelled steerable vehicle frame movable over successive rows of tobacco plants in a field, mechanical defoliating means carried by said frame for removing leaves from tobacco plants during the movement of said vehicle frame in the field, elevator means on the rear of said frame for receiving a container and raising the same to an elevated loading position overlying the tobacco plants in the field, conveyor means for receiving the removed leaves from said defoliating means and arranged for discharging the leaves from an end thereof in a flow path having a substantial maximum horizontal extent overlying a container received on said elevator means, and leaf distributing means disposed above the container when retained in its elevated loading position by said elevator means and cooperating with said conveyor means for laterally and longitudinally uniformly distributing the leaves discharging from said conveyor means along said flow path into the container in said elevated loading position, said leaf distributing means comprising baffle means having surfaces for stopping the horizontal movement of the leaves in said flow path while permitting continued downward movement and for imparting a lateral movement to the leaves in conjunction with the continued downward movement thereof, and moving means for effectiing repetitious cyclical movements of said baffle means in both longitudinal and lateral horizontal directions sufficient to distribute the leaves within the container not only uniformly along the longitudinal extent thereof, as aforesaid, but the lateral extent thereof as well.

* * * * *